Patented Dec. 18, 1928.

1,695,285

UNITED STATES PATENT OFFICE.

ALPHONS O. JAEGER AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE.

CATALYTIC OXIDATION OF SULPHUR DIOXIDE.

No Drawing.   Application filed February 6, 1926. Serial No. 86,653.

This invention relates to the catalytic oxidation of sulphur dioxide and, more particularly, to processes in which the sulphur dioxide containing gases include impurities which are poisonous to platinum catalysts.

Platinum, the most widely used catalyst in the contact sulphuric acid process, while efficient from the standpoint of yields, is very delicate and is easily poisoned, temporarily or permanently, by relatively small amounts of the impurities in the reaction gases. Thus, even very small amounts of arsenic, selenium, tellurium, antimony, chlorine, hydrochloric acid, iodine, silicon fluoride, mercury and the so-called acid-mist, are sufficient to poison platinum catalysts and to very markedly reduce their effectiveness.

In the case of some of the poisons, such as hydrochloric acid and chlorine, the platinum catalysts may be revivified by blowing with hot air. In the case of some of the other poisons, the platinum catalyst may require removal from the converters to purify. In any event, the process is interrupted and the cost of purification is so high that it is not commercially practicable to carry on the contact process with gases containing appreciable amounts of catalyst poisons. The purification of burner gases, or other gases containing sulphur dioxide, is difficult and expensive and particularly in the case of gases which contain halogen or halogen compounds, the purification necessitates cooling down the burner gases with resultant loss of a great deal of heat and increased cost of production of sulphur trioxide.

Owing to the low market price of sulphuric acid, any factor which causes added expense is apt to seriously affect commercial production and may even in some cases render the use of certain raw materials which contain large amounts of catalyst poisons, impractical for the production of sulphur dioxide gases to be used in the process.

In the past, it has been proposed to use vanadium catalysts, although these catalysts have never achieved the importance of platinum. In connection with operations with vanadium, catalysts, it has been noted that arsenic, which is one of the most serious poisons for platinum catalysts, did not injure the vanadium catalyst.

We have now found that catalysts which contain vanadium, or one or more of the catalytic elements chromium, tungsten, uranium, manganese, niobium, tantalum, bismuth, arsenic, phosphorus, titanium and the like, are almost entirely unaffected by small amounts of catalyst poisons other than arsenic and particularly it has been found that vanadium catalysts and other non-platinum catalysts are almost totally unaffected by the presence of even considerable amounts of hydrochloric acid or acid mist in burner gases or other gases containing sulphur dioxide. The present invention thus opens up a new field of raw materials for the production of sulphuric acid by the contact process and makes the complicated and expensive purification processes which were hitherto required in case of burner gases containing catalyst poisons unnecessary, thus decreasing the cost of production of sulphuric acid and at the same time making available burner gases from such sources as Louisiana, Freeport or Texas sulphurs, which contain, among other poisons, considerable amounts of hydrochloric acid and other materials which have hitherto been used only under serious disadvantages.

Not only is the activity of the catalysts used in the present invention substantially unaffected by the above referred to catalyst poisons, but in the case of many of the vanadium catalysts, hydrochloric acid and acid mist actually increase the catalytic efficiency of the contact mass.

The omission of the hitherto required purification of burner gases permits the use of hot burner gases directly in the contact process which effects notable saving. It is to be understood, of course, that in the process of the present invention, it is desirable and in most cases necessary to remove dust particles from the gases which, however, is a very simple matter and can be effected in numerous well known ways, such as filtration, electrostatic precipitation and the like without cooling down the burner gases to an uneconomical point.

It is desirable in the process of the present invention to dry the reaction gases as far as possible, although this is not as essential in the case of non-platinum catalysts as it is in the case of platinum catalysts. Where burner gases are used cold, the drying may be effected by passing the cold gases through any of the well known drying systems and in the same manner drying any additional fresh air which is added. Where it is desired to effect the economies possible by the use of hot burner gases in the contact process, drying may be effected by drying the added air and also the sulphur or sulphur containing raw material before burning. The invention is, of course, not limited to any particular method of drying, nor in its broadest aspects is it limited to the use of completely dry reaction gases.

Any of the known non-platinum catalysts may be used in the process of the present invention and the invention is not limited to any particular catalyst or class of catalysts. We have found that the catalytic zeolites which are described in our co-pending applications, Serial No. 86,652, filed February 6, 1926; Serial No. 88,487 filed February 15, 1926; Serial No. 88,488, filed February 15, 1926 are particularly effective, but the invention is not limited to them and we do not in this application claim the process of catalytically oxidizing sulphur dioxide in the presence of catalytically active zeolites, this forming the subject matter of our above referred to applications. On the contrary, the present application is limited to processes of oxidizing sulphur dioxide in which the reaction gases contain material amounts of certain catalytic poisons.

The following specific examples will illustrate the present invention applied to the catalytic oxidation of various $SO_2$ gases which contain catalyst poisons and in the presence of representative numbers of various types of non-platinum catalysts. The invention is, of course, not limited to the details of the specific examples, nor should these examples be taken to mean that particular gases are preferably used with particular catalysts. On the contrary, the specific examples have been chosen in an effort to illustrate a number of types of impure reaction gases together with a number of types of catalysts.

*Example 1.*

A catalyst is prepared by dissolving 5.15 kg. KOH in 300 ls. of water to which 1 kg. finely powdered $V_2O_5$ is gradually added. The solution is then neutralized with dilute hydrochloric acid and diluted with water to 1500 l. To the reddish yellow liquid is added 140 kg. potassium silicate (20.95% $SiO_2$ and 9.5% $K_2O$) and 60 kg. kieselguhr, and 10 kg. asbestos fibres are stirred into the solution. The mixture is then cautiously warmed with vigorous agitation to about 60–70° C. and dilute hydrochloric acid is added, in small portions, until the dispersing agent is only just alkaline. The mass thus produced is pressed to remove the alkaline solution, dried, broken in pieces and hydrated.

The contact mass thus produced is filled into a converter and purified burner gases which are free from even traces of contact poisons are passed through at an average temperature of 450° C. at the usual gas speeds, the yield of $SO_3$ being about 97–97.5%.

Small amounts of hydrochloric acid are then added to the burner gases to artificially introduce these catalyst poisons. The burner gases containing small but substantial amounts of HCl are then passed through the converter at the same temperature. The yield of $SO_3$ remains precisely the same as with pure burner gases and the effectiveness of the vanadium contact mass is actually increased in that a higher gas speed with a correspondingly higher loading of the catalyst can be utilized.

*Example 2.*

Burner gases produced by burning Louisiana brimstone in air and which contain chlorine compounds are passed over a platinum contact mass without purification. In a short time, depending on the HCl content of the burner gases, a temporary or permanent poisoning of the contact mass takes place and the yield of $SO_3$ falls rapidly.

The same burner gases are passed over powerful vanadium catalysts and no symptoms of poisoning can be noted, the yields of $SO_3$ remaining the same or actually increasing under the same conditions of temperature, gas speed and pressure.

A similar effect is to be noted when burner gases from Freeport or Texas sulphur are used. These gases contain material amounts of chlorine.

*Example 3.*

1. A catalyst is prepared by stirring 1 mol. of $V_2O_5$ with concentrated sulphuric acid to form a paste, carefully diluting with water and then passing a rapid stream of sulphur dioxide through the mixture with gentle heating until a completely clear blue solution is formed. The excess of sulphur dioxide is then removed by boiling and sufficient KOH solution is added until the brown precipitate which first forms dissolves up to the dark brown liquid.

2. 4 mol. of $SiO_2$ in the form of potassium silicate are diluted with 5 times the amount of water and enough celite or finely divided quartz is stirred in until the mixture remains just stirrable. The potassium vanadite solution described above is then poured in to the silicate mixture, gently warmed, and dilute sulphuric acid is added in small proportions until the dispersing agent remains just alkaline. The gel-like mass which forms is then pressed, washed, dried and broken into pieces.

Burner gases from pyrites containing selenium and tellurium and which have not been purified except by removal of dust are passed over the above described catalysts under the usual conditions of temperature, pressure, gas speed and the like. The yield of $SO_3$ is practically theoretical and is the same as that which can be obtained by using purified burner gases.

The burner gases can be passed directly into the converter while still hot after passing through a dust remover and can furnish the necessary heat for initiating the contact process.

*Example 4.*

1000 parts of an artificial zeolite are treated at a slightly elevated temperature with a 10% solution of equal parts of silver sulphate and copper sulphate until base exchange is substantially complete. The mixed copper-silver zeolite thus formed is treated with a dilute solution of 75% potassium vanadite and 25% potassium tungstate forming the so-called vanado-tungstate of the silver-copper zeolite.

Burner gases from pyrites containing mercury and arsenic are passed through an electrostatic dust separator and then into a converter filled with the catalysts described above. The conversion of $SO_2$ to $SO_3$ obtained is the same whether raw burner gases or purified burner gases are used.

Commercial burner gases of all kinds which have not been purified except for the removal of dust, can be used with these catalysts without any symptoms of poisoning. The burner gases can be used hot or cold depending on the converter system.

In the claims the expression "catalyst poisons other than arsenic" does not exclude the presence of arsenic itself. In other words, claims containing this expression are directed to the oxidation of sulphur dioxide which contains catalyst poisons other than arsenic and in addition may or may not contain arsenic itself, the only gases excluded from the claims are those gases which contain no catalyst poisons at all or which contain only arsenic.

Having thus described our invention, what we desire to secure by United States Letters Patent and claim is:

1. The process of catalytically oxidizing sulphur dioxide which comprises passing gases containing sulphur dioxide, oxygen and at least one catalyst poison other than arsenic alone at elevated temperatures over catalytically active zeolites which are free from platinum.

2. The process of catalytically oxidizing sulphur dioxide which comprises passing gases containing sulphur dioxide, oxygen and acid halogen compounds at elevated temperatures over catalytically active zeolites which are free from platinum.

3. The process of catalytically oxidizing sulphur dioxide which comprises passing gases containing sulphur dioxide, oxygen and at least one catalyst poison other than arsenic alone at elevated temperatures over zeolite catalysts which are free from platinum and which contain catalytically active basic radicals in non-exchangeable form.

4. The process of catalytically oxidizing sulphur dixide which comprises passing gases containing sulphur dioxide, oxygen and acid halogen compounds at elevated temperatures over zeolite catalysts which are free from platinum and which contain catalytically active basic radicals in non-exchangeable form.

5. The process of catalytically oxidizing sulphur dioxide which comprises passing gases containing sulphur dioxide, oxygen and at least one catalyst poison other than arsenic alone at elevated temperatures over zeolite catalysts which are free from platinum and which contain vanadium in non-exchangeable form.

6. The process of catalytically oxidizing sulphur dioxide which comprises passing gases containing sulphur dioxide, oxygen and acid halogen compounds at elevated temperatures over zeolite catalysts which are free from platinum and which contain vanadium in non-exchangeable form.

7. The process of catalytically oxidizing sulphur dioxide which comprises passing gases containing sulphur dioxide, oxygen and at least one catalyst poison other than arsenic alone at elevated temperatures over zeolite catalysts which are free from platinum and in which catalytically active zeolites are combined with catalytically active acid radicals.

8. The process of catalytically oxidizing sulphur dioxide which comprises passing gases containing sulphur dioxide, oxygen and acid halogen compounds at elevated temperature over zeolite catalysts which are free from platinum and in which catalytically active zeolites are combined with catalytically active acid radicals.

9. The process of catalytically oxidizing sulphur dioxide which comprises passing gases containing sulphur dioxide, oxygen and at least one catalyst poison other than arsenic alone at elevated temperatures over catalysts which are free from platinum and include a catalytically active zeolite containing a catalytically active basic radical in non-exchangeable form and a catalytically active basic radical in exchangeable form.

10. The process of catalytically oxidizing sulphur dioxide which comprises passing gases containing sulphur dioxide, oxygen and acid halogen compounds at elevated temperatures over catalysts which are free from platinum and include a catalytically active zeolite containing a catalytically active basic radical in non-exchangeable form and a catalytically active basic radical in exchangeable form.

11. The process of catalytically oxidizing sulphur dioxide which comprises passing gases containing sulphur dioxide, oxygen and at least one catalyst poison other than arsenic alone at elevated temperatures over catalysts which are free from platinum and include a catalytically active zeolite containing a catalytically active basic radical in non-exchangeable form and a catalytically active basic radical in exchangeable form and is combined with a catalytically inactive acid radical.

12. The process of catalytically oxidizing sulphur dioxide which comprises passing gases containing sulphur dioxide, oxygen and acid halogen compounds at elevated temperatures over catalysts which are free from platinum and include a catalytically active zeolite containing a catalytically active basic radical in non-exchangeable form and a catalytically active basic radical in exchangeable form and is combined with a catalytically inactive acid radical.

Signed at St. Louis, Missouri, this 3rd day of February, 1926.

ALPHONS O. JAEGER.
JOHANN A. BERTSCH.